(12) United States Patent
Salyer

(10) Patent No.: US 7,759,287 B2
(45) Date of Patent: Jul. 20, 2010

(54) COMPOSITION AND METHOD FOR FUEL GAS STORAGE AND RELEASE

(76) Inventor: Ival O. Salyer, 6757 Gaines Ferry Rd., Flowery Branch, GA (US) 30542

( * ) Notice: Subject to any disclaimer, the term of this patent is extended or adjusted under 35 U.S.C. 154(b) by 260 days.

(21) Appl. No.: 12/135,284

(22) Filed: Jun. 9, 2008

(65) Prior Publication Data
US 2008/0237067 A1    Oct. 2, 2008

(51) Int. Cl.
*F17C 11/00*    (2006.01)
*C01B 3/00*    (2006.01)
(52) U.S. Cl. .................. 502/402; 502/526; 206/0.7
(58) Field of Classification Search .......... 96/108, 96/143, 146; 95/116, 148, 900; 423/248, 423/648.1; 206/0.7; 502/526, 402
See application file for complete search history.

(56) References Cited
U.S. PATENT DOCUMENTS

| | | | |
|---|---|---|---|
| 4,182,398 A | 1/1980 | Salyer et al. | |
| 4,328,768 A | 5/1982 | Tracy et al. | |
| 5,174,938 A * | 12/1992 | Ito et al. | 264/112 |
| 5,418,203 A * | 5/1995 | Ichikawa et al. | 502/402 |
| 5,817,157 A * | 10/1998 | Checketts | 48/61 |
| 6,309,449 B1 | 10/2001 | Klos et al. | |
| 2006/0065553 A1* | 3/2006 | Golben | 206/0.7 |
| 2006/0237688 A1* | 10/2006 | Zimmermann | 252/184 |
| 2008/0035200 A1 | 2/2008 | Chabak | |

* cited by examiner

*Primary Examiner*—Frank M Lawrence
(74) *Attorney, Agent, or Firm*—Dinsmore & Shohl LLP

(57) ABSTRACT

A composition and method of storing and releasing fuel gas such as hydrogen, methane or natural gas is provided which utilizes lightly crosslinked high density polyethylene pellets. Fuel gas is stored by placing the pellets in a reaction chamber which is heated to a temperature slightly above the crystalline melting point of the pellets, followed by the introduction of fuel gas into the chamber. The fuel gas permeates the pellets and becomes contained therein upon cooling of the pellets under pressure. The fuel gas may be stored indefinitely in the pellets at ambient temperature. When release of the fuel gas is desired, the pellets are incrementally metered into a discharge chamber and are heated to a temperature above the crystalline melting point of the pellets under a pressure from about 5 to 200 psi such that the fuel gas is released from the pellets for use. The expended pellets may then be recycled for further fuel gas storage.

17 Claims, 3 Drawing Sheets

COMPOSITION AND METHOD FOR FUEL GAS STORAGE AND RELEASE

BACKGROUND OF THE INVENTION

The present invention relates to a composition and method for storing and releasing fuel gases such as hydrogen, and more particularly, to the use of lightly crosslinked high density polyethylene pellets to effectively store and release useful quantities of fuel gases.

It is well known that hydrogen is a very efficient and clean-burning fuel. However, the storage of hydrogen prior to its use has presented some difficulties. For example, hydrogen has physical characteristics which make it difficult to store in large quantities without taking up a significant amount of space. Currently, hydrogen is typically stored as a gas under high pressure in a large, heavy tank or vessel. It would be desirable to be able to store large quantities of hydrogen in smaller volumes at lower pressure and near room temperature.

One method which has been proposed for hydrogen storage includes the use of hollow microspheres filled with hydrogen gas. For example, hollow microspheres may be filled with hydrogen gas and stored in a chamber. When release of the hydrogen is desired, the hollow microspheres are moved from a storage chamber to a heated delivery and diffusion chamber. However, the use of hollow microspheres has several limitations. For example, because such microspheres are hollow, they cannot store a very high quantity of hydrogen. In addition, the spheres must have a minimum wall thickness to avoid collapse, which thickness often results in slower permeation and discharge rates.

While the storage of hydrogen has been proposed within other matrices such as amorphous hydrocarbon rubbers, the quantity of hydrogen which can be stored in such rubbers has been too low to allow practical use.

Accordingly, there is still a need in the art for a composition and method of effectively storing and releasing fuel gases such as hydrogen which allows a useful quantity of gas to be easily stored and released in a cost-efficient manner.

SUMMARY OF THE INVENTION

The present invention meets those needs by providing a composition and method of storing and releasing fuel gases such as hydrogen which utilizes lightly crosslinked high density polyethylene pellets.

According to one aspect of the present invention, a method of storing a useful quantity of fuel gas is provided which comprises providing lightly crosslinked high density polyethylene pellets, and placing the pellets in a reaction chamber which includes heating and cooling elements therein. Fuel gas is then introduced into the chamber under pressure while heating the chamber to a temperature slightly above the crystalline melting point of the pellets such that the pellets become amorphous and the gas permeates the pellets. The reaction chamber is preferably heated to a temperature between about 132° C. to 170° C., and more preferably, about 150° C. After the pellets are permeated with a sufficient amount of gas, the chamber is then cooled under pressure below the melting point of the pellets such that the gas becomes contained within the crystalline matrix of the pellets. It should be appreciated that the gas is dissolved within the crystalline matrix, i.e., gas is dispersed as individual molecules within the matrix of the polymer.

By "fuel gas," it is meant a gas which can be burned to produce thermal energy. In the present invention, such fuel gases may include hydrogen, methane, and natural gas.

The lightly crosslinked high density polyethylene pellets preferably have an initial diameter (i.e., prior to incorporation of fuel gas) of between about 1/16 inch and 3/16 inch. By "lightly crosslinked," it is meant that one polymer chain is linked to another by a chemical bond to promote a difference in physical properties such that the crosslinked polymer retains at least 70%, and more preferably, 80% of the heat of fusion of the uncrosslinked crystalline polymer and yet is sufficiently crosslinked for the pieces not to stick together or undergo melt flow upon being cycled above and below the melting point of the polymer.

During introduction of fuel gas into the chamber, the chamber is maintained at a pressure between about 50 to 4000 psi.

After the pellets are cooled, the pellets containing fuel gas therein may be stored indefinitely at room temperature until use. When it is desired to release gas from the high density polyethylene pellets for use, the permeated pellets are incrementally introduced into a discharge chamber including heating and cooling elements therein, and the chamber is heated to a temperature slightly above the crystalline melting point of the pellets, i.e., from about 132° C. to about 170° C., and preferably, about 150° C., such that the pellets become amorphous and the gas is released for use. Preferably, the gas is released under a pressure of between about 5 to 200 psi, and more preferably, less than or equal to about 50 psi.

When the supply of gas in the pellets is expended, the chamber is preferably cooled to ambient temperature and the exhausted pellets may be recovered and recycled for further use.

Accordingly, it is a feature of the present invention to provide a composition and method of effectively storing and releasing fuel gases such as hydrogen. Other features and advantages of the invention will be apparent from the following description, the accompanying drawings, and the appended claims.

DETAILED DESCRIPTION OF THE PREFERRED EMBODIMENTS

Figures 1A, 1B:
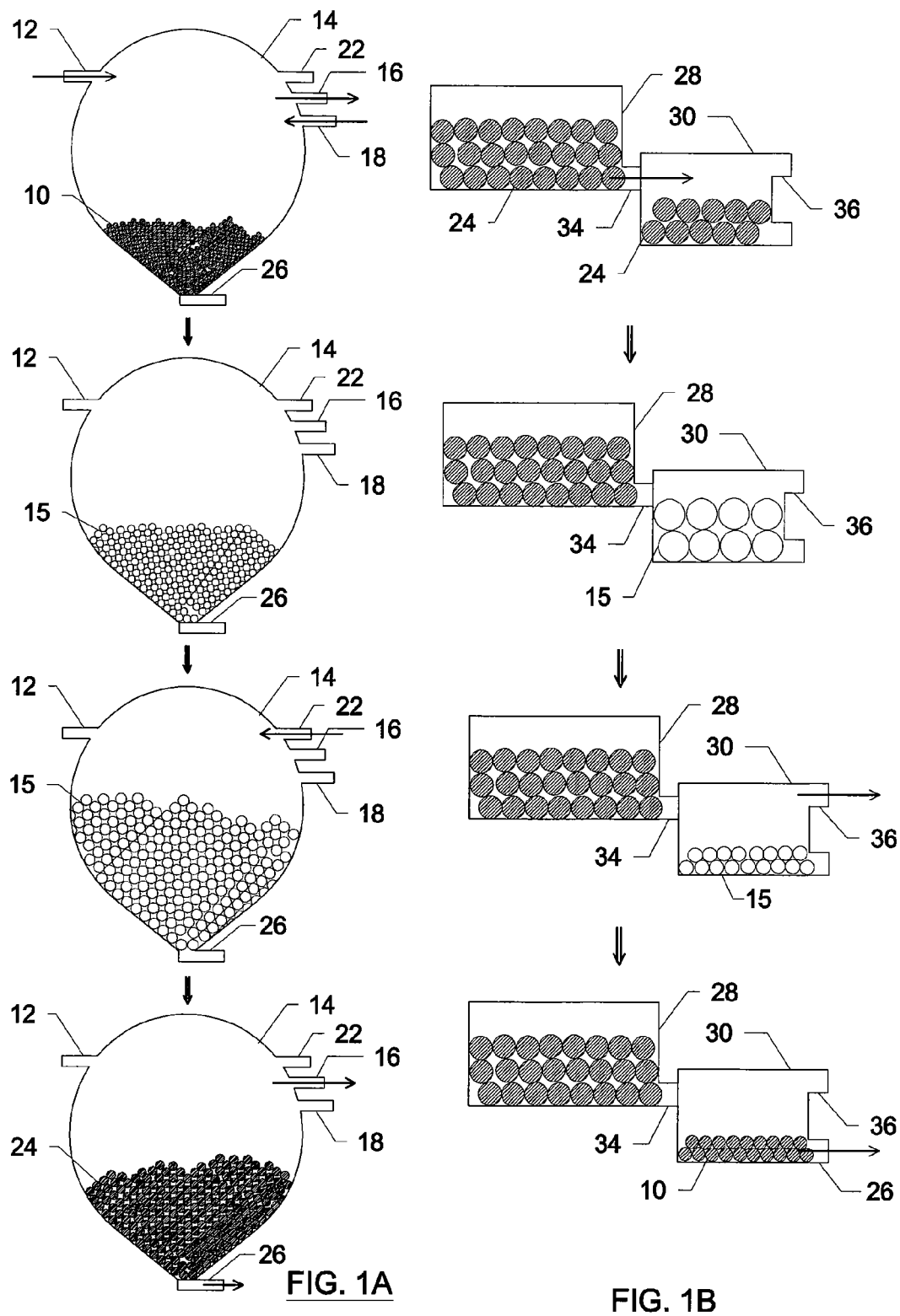
FIG. 1A is a step-wise illustration of the method for storing hydrogen in lightly crosslinked high density polyethylene pellets in accordance with an embodiment of the present invention.
FIG. 1B is a step-wise illustration of the method of releasing stored hydrogen from lightly crosslinked high density polyethylene pellets in accordance with the present invention.

It is believed that the use of lightly crosslinked high density polyethylene pellets to store and release fuel gases such as hydrogen, methane and natural gas offers many advantages over prior fuel gas storage methods. For example, the method provides storage of useful quantities of hydrogen and other fuel gases without exceeding the elastomeric integrity of the pellets used for storage. Further, there should be no significant loss of gases during the storage/permeation process.

The method also provides controllable low operational pressure during fuel discharge. This provides an advantage over prior hydrogen fuel tanks designed for use in automobiles which operate under a much higher pressure and store a large quantity of fuel, which is subject to explosion, for example, in a crash. In contrast, in the present invention, the incremental introduction of pellets into the discharge chamber ensures that the gas within the discharge chamber is never at high pressure. This significantly reduces the chance of explosion in the event of a crash. In addition, the discharge chamber of the present invention allows more efficient fuel consumption in transportation applications than the heavier fuel tanks used in current applications.

The pellets containing fuel gas therein may be stored indefinitely at ambient temperature and pressure without significant loss of the gas. In addition, upon release of the fuel gas, the expended pellets may be recovered and reprocessed for repeated use, resulting in cost savings.

The fuel gases for use in the present invention may include hydrogen, methane, and natural gas. It should be appreciated that other fuel gases such as ethane, propane, butane and the like may also be used as long as such fuels are in a gaseous form at room temperature.

Suitable high density polyethylene pellets for use in the present invention are commercially available from Chevron, Phillips, Dow and Dupont. The high density polyethylene pellets may be used in the form of cubes or spheres. Smaller sized spheres of between about 1/16 inch to 3/16 inches in diameter are preferred for use in the present invention. Such pellets have a density ranging from 0.95 to 0.97 g/cm$^3$, with about 0.96 g/cm$^3$ preferred.

The pellets also have a melt index (prior to crosslinking) ranging from about 0.2 to 2.0, with a preferred melt index of about 0.6.

The high density polyethylene pellets are crosslinked prior to use. The pellets may be crosslinked by a number of different methods. The desired degree of crosslinking may be achieved by chemical grafting, gamma irradiation, or electron beam bombardment as described in U.S. Pat. No. 4,182,398, the disclosure of which is incorporated herein by reference. Electron beam bombardment is preferred for use as it is cost effective and involves a simple process. The desired level of crosslinking may be achieved with radiation doses of between about 4-20 mega RADs, and more preferably, 6-10 mega RADs. Higher crosslinking is generally undesirable as it progressively reduces the crystallinity of polyethylene. Once crosslinked, the polyethylene pellets have an advantage in that they do not undergo melt-flow and thus retain their shape and form above their crystalline melting temperature, i.e., about 130-132° C. The lightly crosslinked polyethylene pellets may then be permeated with fuel gas by heating to a temperature which is slightly above the crystalline melting point of the pellets, i.e., about 132° C. to 170° C., and more preferably, about 150° C. By heating to a temperature which is just slightly above the melting point of the pellets, the pellets are not degraded during the fuel gas permeation or release process.

It should be appreciated that the pellets will undergo phase changes during the permeation and release of fuel gas. For example, in the initial raw state, the pellets are white and opaque, and have a crystalline structure with a density of about 0.965 g/cm$^3$. Once heated above their melting point, the pellets become clear and amorphous with a density of approximately 0.88 g/cm$^3$. After introduction of pressurized fuel gas, the amorphous pellets expand in proportion to the amount of gas absorbed. Once the charged pellets are cooled under pressure, the pellets then return to a crystalline, opaque form.

Figure 2:
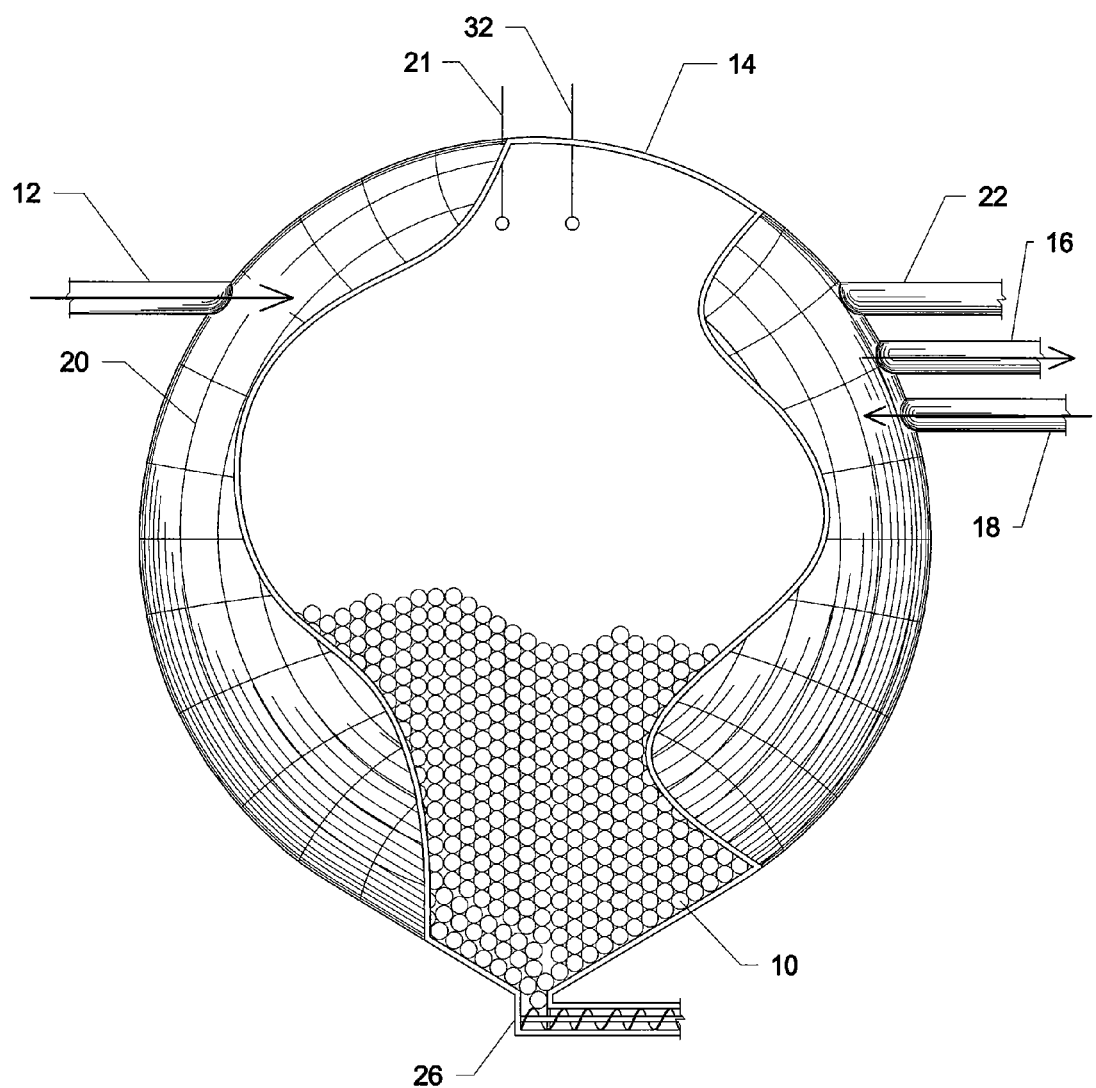
FIG. 2 is an enlarged view of the reactor chamber shown in FIG. 1A.

Referring now to FIG. 1A and FIG. 2, an embodiment of the fuel gas storage method of the present invention is illustrated. Lightly crosslinked high density polyethylene pellets 10 are loaded through an inlet 12 to a permeation and compression reaction chamber 14. The reaction chamber may comprise any hollow tank which is capable of holding the desired amount of pellets and capable of withstanding pressures up to 4000 psi. The chamber should also include heating and cooling elements therein as will be explained below and should be able to withstand repetitive heating and cooling.

Any air initially present in the reaction chamber may be removed at room temperature by a vacuum pump (not shown) via vacuum line or outlet 16. Preferably, the chamber is purged of air by flushing with an inert gas such as nitrogen, helium, or $CO_2$ introduced through flush line 18.

After the pellets 10 are loaded into the reaction chamber, the chamber is then heated with a suitable heating element. For example, the chamber may be heated externally using electric coils 20 as shown in FIG. 2. Controlled heating of the reaction chamber may be monitored by a thermostat 21 as shown in FIG. 2. When the chamber (and the pellets therein) reach a temperature of about 150° C. (which is above the crystalline melting point of the high density polyethylene pellets), the pellets 15 become amorphous and are permeable to gas. In this amorphous state, the pellets typically increase in size by about 15%. A fuel gas such as hydrogen, methane or natural gas is then pumped in under pressure in a gaseous form through fuel gas input line or inlet 22, preferably at an initial pressure of about 5 psi which is then increased over the course of the heating cycle to about 50 to 4000 psi. It should be appreciated that the pressure may vary according to the elastomeric properties of the pellets, the amount of fuel gas storage desired, and the type of equipment used. The pressure may be monitored with a pressure sensor 32 as shown in FIG. 2.

As the fuel gas is absorbed into the polyethylene pellets, the pellets 15 expand, but do not melt flow and do not stick together. Preferably, the gas percolates from the bottom of the chamber so that there is mixing and stirring of the pellet bed. The input of fuel gas is preferably monitored using, for example, a flow meter (not shown). After permeation of the fuel gas into the pellets is complete, the pressure of the fuel gas in the reactor is maintained while the temperature is lowered to below the crystalline melting point of the pellets. The pressure is maintained as the chamber/pellets are cooled, enabling the fuel to remain within the amorphous pellets until such time as the pellets return to the crystalline state.

When the temperature drops below 132° C., the pressure is gradually dropped to an ambient pressure of about 15 psi. During this cooling process, the heating elements are turned off and air is preferably circulated around the outside of the chamber until the temperature in the chamber reaches ambient temperature, or about 25° C. Cooling may be accomplished using any suitable means including the use of air, water baths, or refrigerants.

The charged pellets 24 containing fuel gas therein can then be removed from the chamber, for example, by a screw conveyor 26 or other means including a drop opening or pneumatic means.

Figure 3:
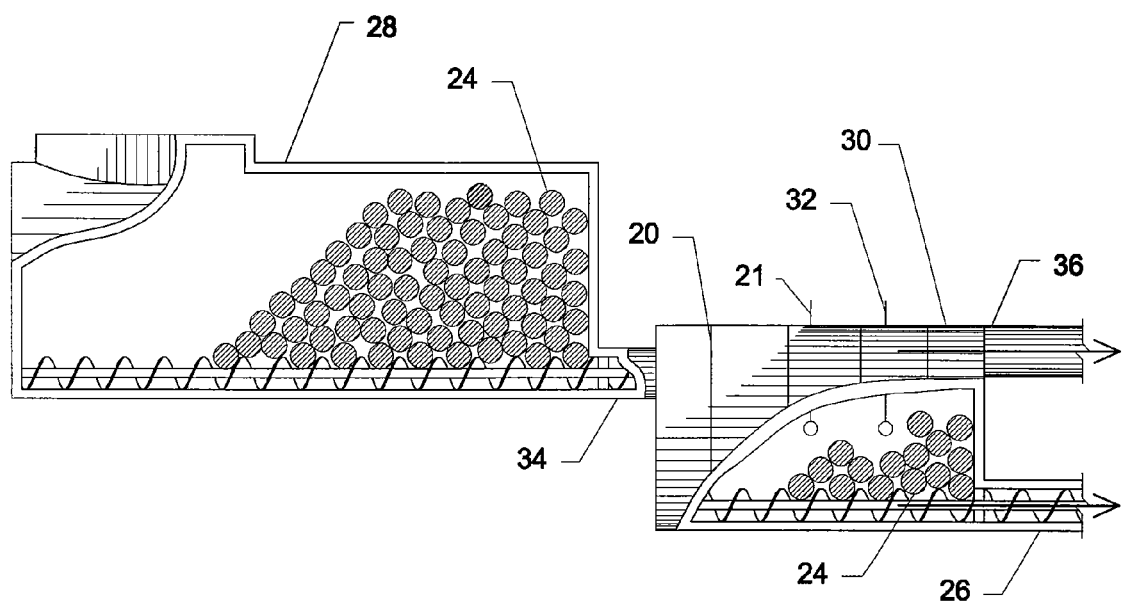
FIG. 3 is an enlarged view of the discharge chamber shown in FIG. 1B.

Referring now to FIG. 1B and FIG. 3, the fuel gas release process is shown. As shown, the high density polyethylene pellets 24 including fuel gas therein are loaded into a discharge chamber 30 from a storage chamber 28 or other reservoir via an input line 34. The discharge chamber may comprise a hollow vessel which is preferably spherical or cylindrical in shape, but may comprise any cylindrical vessel which is capable of withstanding the operating pressures and repeated heating and cooling. The discharge chamber 30 includes heating and cooling elements similar to the reaction chamber, and may include a thermostat and pressure sensor as will be explained below.

The chamber is heated by electrical coils 20 as shown in FIG. 3 or any other suitable heating method. The temperature may be monitored by a thermostat 21 as shown in FIG. 3. Once the pellets in the chamber are heated to a temperature slightly above their crystalline melting point (150° C.), they become amorphous pellets 15 and release the fuel gas contained therein.

It should be appreciated that the amount of fuel gas released may be controlled by the amount of pellets introduced into the chamber. Preferably, the chamber includes a pressure sensor 32 as shown in FIG. 3 which can be used to control the dispensing of pellets into the chamber by monitoring the pressure within the reactor. For example, as the pressure in the reactor increases, the addition of pellets into the chamber via input line 34 is slowed or stopped. As the pressure drops, additional pellets may be added. The chamber may be maintained at a pressure of between about 5 to 200 psi, and more preferably, about 50 psi or below. Thus, the low operating pressure of the discharge chamber is made possible by the incremental addition of the pellets into the discharge chamber from the storage chamber, which provides significant safety advantages over prior art systems as discussed above.

Once released from the pellets, fuel gas may be pumped from the discharge chamber 30 in gaseous form under pressure via output line 36. When the supply of fuel gas in the pellets is expended, and no additional pellets remain in the storage chamber to be introduced into the discharge chamber, the discharge chamber is preferably cooled to ambient temperature such that the pellets 10 return to a crystalline state and can be removed from the chamber by a screw conveyor 26 or other means. The expended pellets may then be recycled for further fuel gas storage.

The composition and method of the present invention may be used for fuel gas storage and release for a number of applications, including automotive transportation, for example in fuel cells, home heating, generation of electricity at remote locations, and the like.

Having described the invention in detail and by reference to preferred embodiments thereof, it will be apparent that modifications and variations are possible without departing from the scope of the invention.

What is claimed is:

1. A method of storing a quantity of fuel gas comprising:
   providing lightly crosslinked high density polyethylene pellets;
   placing said pellets in a reaction chamber, said reaction chamber including heating and cooling elements therein;
   introducing fuel gas into said chamber under pressure while heating said chamber to a temperature slightly above the crystalline melting point of said pellets such that said fuel gas permeates said pellets; and
   cooling said chamber below the melting point of said pellets under pressure such that said fuel gas is contained in said pellets.

2. The method of claim 1 wherein said chamber is heated to a temperature between about 132° C. and 170° C.

3. The method of claim 1 wherein said chamber is heated to a temperature of about 150° C.

4. The method of claim 1 wherein said polyethylene pellets have an initial diameter of between about 1/16 inch and 3/16 inch.

5. The method of claim 1 wherein said polyethylene pellets have a density of between about 0.95 to 0.97 g/cm$^3$.

6. The method of claim 1 wherein said polyethylene pellets have a melt index of from about 0.2 to 2.0.

7. The method of claim 1 wherein said lightly crosslinked high density polyethylene pellets have been crosslinked by chemical grafting, gamma irradiation, or electron bombardment.

8. The method of claim 1 wherein said chamber is maintained at a pressure between about 50 to 4000 psi during introduction of said fuel gas.

9. The method of claim 1 including storing said pellets containing fuel gas therein at ambient temperature and pressure.

10. The method of claim 1 wherein said fuel gas is selected from hydrogen, methane, and natural gas.

11. Lightly crosslinked high density polyethylene pellets including fuel gas therein formed by the method of claim 1.

12. A method of using a composition comprising lightly crosslinked high density polyethylene pellets having fuel gas contained therein comprising releasing said fuel gas stored in said pellets by incrementally placing said pellets in a discharge chamber including heating and cooling elements therein and heating said discharge chamber to a temperature slightly above the crystalline melting point of the pellets such that said fuel gas is released.

13. The method of claim 12 wherein said fuel gas is released under a pressure of between about 5 to 200 psi.

14. The method of claim 12 wherein said fuel gas is released under a pressure of less than or equal to about 50 psi.

15. The method of claim 12 including cooling said chamber to ambient temperature and recovering the pellets.

16. The method of claim 12 including reusing said recovered high density polyethylene pellets for further fuel gas storage.

17. A composition comprising lightly crosslinked high density polyethylene pellets having a useful amount of fuel gas contained therein.

\* \* \* \* \*